3,195,750
REFUSE COLLECTING VEHICLE
Adolf Ochsner, Kusnacht, near Zurich, Switzerland, assignor to J. Ochsner & Cie., AG., Zurich, Switzerland
Filed Sept. 30, 1964, Ser. No. 400,362
Claims priority, application Switzerland, Oct. 1, 1963,
12,072/63
7 Claims. (Cl. 214—518)

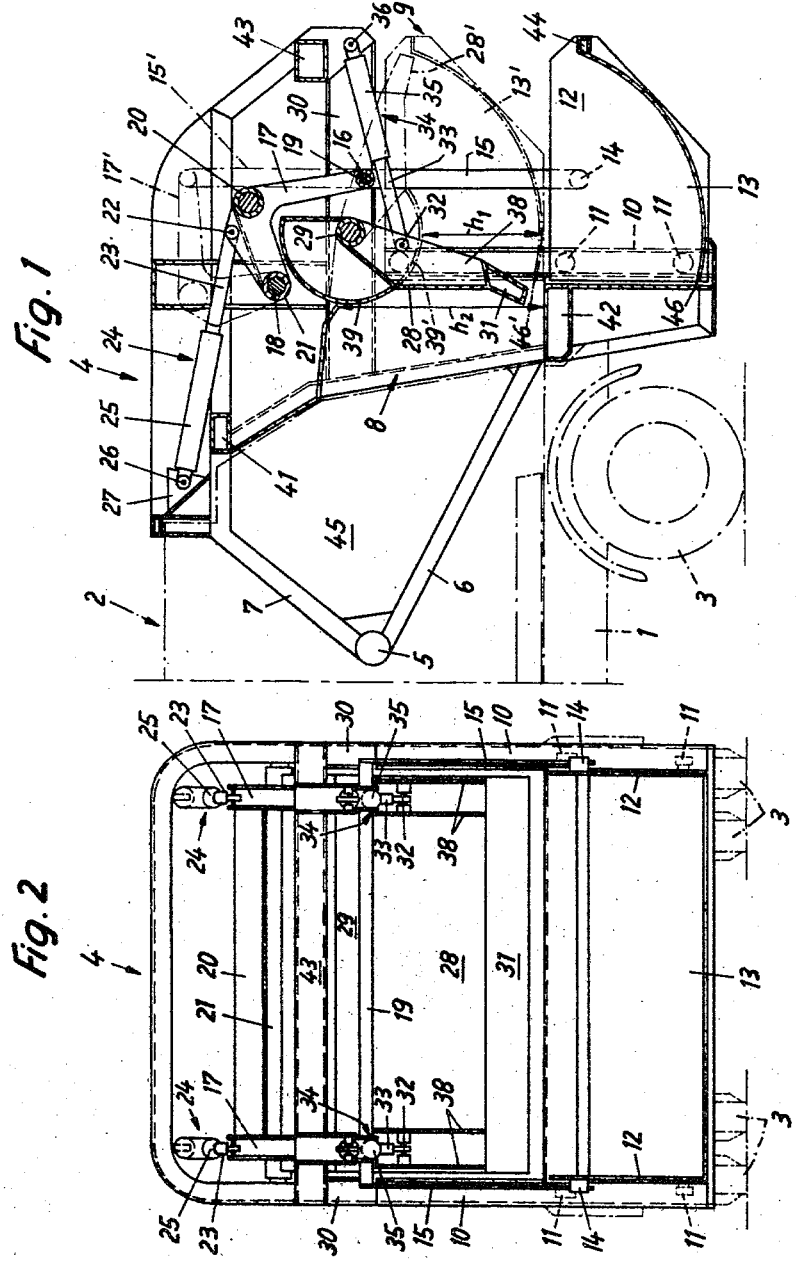

This invention relates to loading and packing gear in refuse collecting vehicles for handling bulky refuse.

In existing gear of this kind the refuse must either be lifted to a relatively high level for tipping it into the vehicle, or the degree of compaction achieved is not satisfactory, or the capacity of the loading space is insufficient. Several of these shortcomings may in fact be present at the same time.

It is therefore a primary object of the present invention to provide loading and packing gear for refuse collecting vehicles which is free from these disadvantages.

Another object of the invention is the provision of loading and packing gear which is so constructed as to avoid the troublesome jamming of moving parts which is a frequent occurrence in the gear used hitherto.

A further object of the invention is to provide a packing plate in loading and packing gear which serves the double function of normally closing a loading opening in the vehicle body and compacting refuse as it forces it into the body through the said opening.

Yet another object is the provision of a skip which can be raised from a lowered position into an upper position where it is precompacted and then forced into the body of the vehicle.

With these and other objects in view, the invention provides loading and packing gear for handling bulky refuse comprising means arranged to support said gear on said vehicle, a trough-shaped refuse-receiving skip forming part of said gear and provided with a part-cylindrical bottom surface, rollers carried by said skip for rolling movement along upright guideways whereby said skip may be raised and lowered on said vehicle, a pair of double-acting lifting rams connected to said skip by a pair of lever linkages for raising and lowering said skip, a packing plate arranged above said skip for swinging movement and mounted so as to close a refuse storage space in said vehicle when said packing plate is in a first position, said packing plate being swingable into a second position wherein refuse in said skip is precompacted by said packing plate upon movement of said skip into an upper position thereof, a pair of double-acting packing rams connected to said packing plate for swinging said packing plate, said part-cylindrical bottom surface of said skip having an axis which is substantially coincident with the axis of swing of said packing plate, and said packing plate being swingable by said packing rams from said second position to said first position whereby said precompacted refuse in said skip is forced into said vehicle refuse storage space by said packing plate.

An example of loading and packing gear in accordance with the invention is schematically shown in the accompanying drawings, in which:

FIGURE 1 is a longitudinal section through the loading and packing gear mounted on the back shield of a refuse collecting vehicle; and FIGURE 2 is a view of the gear from the back of the vehicle.

In FIGURE 1 the rear end of the underframe 1 and of the body 2 as well as the rear wheels of a refuse collecting vehicle are indicated in broken lines. The parts drawn in full lines comprise a back shield 4 pivotally mounted on an axle 5. Two rigidly-connected supporting arms 6 and 7 are mounted on this axle on each side of the vehicle body which is indicated in the drawing as if it were transparent, the arms 6 and 7 being arranged to carry the frame 8 of the shield 4 which carries the loading and packing gear 9.

The frame 8 comprises a guide rail 10 on each side of the vehicle body which is vertical or substantially vertical when the back shield 4 is shut. Each rail 10 guides two rollers 11 attached to the outsides of the side panels 12 of a trough-shaped skip 13 with an open top.

Pivotally attached at 14 to each of the side panels 12 of the skip 13 is the bottom end of a lifting rod 15 which is linked at its upper end at 16 to a bellcrank lever 17 fulcrumed at 18 on the frame 8. The two bellcrank levers 17 are rigidly interconnected by three tubular cross members 19, 20 and 21. Each bellcrank lever 17 is pivotally connected at 22 to the piston rod 23 of a double-acting hydraulic or pneumatic ram 24, the ram cylinders 25 being pivotally attached at 26 to a bracket 27 on the frame.

The upper edge of a packing plate 28 is formed with a transverse tube, each end of the tube being supported on a pin which is not shown in the drawing but which is fitted to two longitudinal horizontal carrier arms 30 in the frame 8 in such a manner that the axis of the tube on the plate 28 constitutes the axis about which the packing plate 28 hinges. The bottom free edge of the packing plate 28 is a transverse-extending hollow section 31 of irregular quadrilateral cross-section. Linked at 32 to the packing plate 28 are the piston rods 33 of two double-acting rams 34 the cylinders 35 of which are hinged at 36 to two brackets 37 forming part of the frame. The packing plate 28 is stiffened by two pairs of webs 38 (see FIGURE 2), a pin fitted between each pair of webs at 32 serving for attachment thereto of the ram 34. The packing plate 28 is also formed with a cylindrical hollow member 39 which will be referred to as a "retaining quadrant" for reasons which will become apparent as the description proceeds.

Transverse hollow sections 40–43 serve as reinforcements for the frame 8, and a small hollow section 44 forms the lip of the skip 13. In the initial full line position of the skip 13 shown in FIGURE 1, this lip is at a low level above the ground so that dust bins or refuse, particularly of a bulky kind, can thus be very conveniently tipped into the skip 13.

The loading and packing gear 9 described above functions in the following manner:

As soon as the skip 13 in its initial position shown in full lines in FIGURE 1 has been charged with refuse, the packing plate 28 is swung upwards in a counter-clockwise direction out of its position shown in FIGURE 1 in full lines into the position 28' shown in broken lines by the operation of the two rams 34 which are referred to hereafter as "packing rams." This movement of the packing plate 28 causes the retaining quadrant 39 to swing into the position marked 39'. In this position the quadrant partially closes an opening of a height $h_2$ so that the opening is reduced to a height $h_1$. Relatively little refuse will therefore fall out through this opening from the refuse storage space 45, any refuse that does fall out dropping into the skip 13 or on to the refuse that has been tipped into the skip.

The skip 13 is now raised by operation of the rams 25 which are referred to hereafter as "lifting rams." In order to raise the skip, the lifting rams retract their piston rods 23, thereby deflecting the bellcrank levers 17 into the position 17' shown in broken lines. By this means the lifting rods 15 are drawn up into the position 15' and the skip is raised into the position 13' while its rollers 11 ride up the guide rails 10. The refuse which has been heaped up in the skip 13 is thus precompacted between the plate 28 and the bottom of the skip as the latter rises. Empty cardboard boxes or other bulky items are thus squeezed down flat.

The plate 28 is now returned into its initial closing position by operation of the packing rams 34 in the opposite direction, with the result that the plate sweeps the precompacted refuse out of the skip 13 into the storage space 45 and further compresses the already partly compacted fresh load by forcing it into the refuse contained inside the storage space 45. For effecting this further compaction it is useful to limit the forward extent of the storage space 45 by a longitudinally-displaceable ejector plate which is thrust forwards by the packing in of the refuse and which can be pushed rearwards by a ram for discharging the refuse from the vehicle through the raised back shield.

The floor of the skip 13 is of part-cylindrical trough shape, the axis of the cylinder coinciding with the pivotal axis of the packing plate 28 when the skip is in raised position 13' so as to leave a small clearance between the bottom edge of the plate and the floor of the skip. In order to prevent bulky objects from becoming wedged between this edge and the floor of the skip, the bottom edge 46 of the trough-shaped skip 13 is about 60 to 80 mm. above the top of the hollow section 42 when the skip is in its raised position, the hollow section 42 being inside the back shield 4 of the vehicle so as to form an extension of the floor of the storage space 45. The lifting rams 25—allowing for the lever transmission and the weight of the skip 13—are slightly less powerful than the packing rams 34 so that, in the event of an object becoming wedged between the packing plate 28 and the floor of the skip 13, the lifting rams 24 will yield and allow the skip 13 to descend slightly. This helps to release the jammed object and permits the packing rams 34 to complete their compressing stroke and to close the packing plate 28. Since the bottom edge 46 of the skip 13 will remain above the top of the hollow section 42 when the skip slightly yields, no step is formed at this point such as might intercept articles contained in the refuse and thereby prevent the packing plate 28 from being closed, as would be the case if the edge 46 descended to a level below the top of the hollow section 42.

When the skip 13 is in its fully raised position 13' it is not essential that the packing plate should be closed immediately. Instead, the skip 13 may first be lowered once more to receive another load of refuse and then raised again. This procedure has the effect of improving the degree of precompaction, particularly when the refuse contains a large number of small items that can be easily squeezed together and flattened. When the degree of precompaction is satisfactory, the material can then be packed into the vehicle in the manner described above.

The loading and packing gear shown in the drawings combines the advantages of possessing a large capacity skip 13, of having a very low loading level, of providing a high degree of compression and of eliminating all causes of jamming both during the operation of the skip 13 (which is ensured by the rigidity resulting from the cross members 19–21 and by the action of the lever transmission 15, 17) and during the operation of the packing plate 28 (which is ensured by the ability of the skip 13 to yield).

I claim:
1. In a refuse collecting vehicle: loading and packing gear for handling bulky refuse, means arranged to support said gear on said vehicle, a trough-shaped refuse-receiving skip forming part of said gear and provided with a part-cylindrical bottom surface, rollers carried by said skip for rolling movement along upright guideways whereby said skip may be raised and lowered on said vehicle, a pair of double-acting lifting rams connected to said skip by a pair of lever linkages for raising and lowering said skip, a packing plate arranged above said skip for swinging movement and mounted so as to close a refuse storage space in said vehicle when said packing plate is in a first position, said packing plate being swingable into a second position wherein refuse in said skip is precompacted by said packing plate upon movement of said skip into an upper position thereof, a pair of double-acting packing rams connected to said packing plate for swinging said packing plate, said part-cylindrical bottom surface of said skip having an axis which is substantially coincident with the axis of swing of said packing plate, said packing plate being swingable by said packing rams from said second position to said first position whereby said precompacted refuse in said skip is forced into said vehicle refuse storage space by said packing plate.

2. Loading and packing gear according to claim 1, wherein said packing plate is provided with a retaining quadrant serving to partly close an opening in said refuse storage space when said packing plate is swung into said second position thereof.

3. Loading and packing gear according to claim 1, wherein said skip has a bottom edge arranged to lie above a floor portion of said refuse storage space when said skip is raised, said lifting rams being adapted to yield should refuse become jammed between the bottom edge of said packing plate and said bottom surface of said skip, thereby allowing said skip to descend slightly without lowering said bottom edge below the level of said floor portion.

4. Loading and packing gear according to claim 1, said skip, said lifting rams, said packing plate and said packing rams are mounted on a back shield, said back shield being hingeably attached to the rear of the body of said vehicle.

5. Loading and packing gear according to claim 1, wherein said lever linkages comprise two corresponding members rigidly interconnected by cross members to ensure rigidity of the two linkages whereby jamming of said skip during its ascent and descent is prevented.

6. Loading and packing gear according to claim 1, wherein said lever linkages comprise two corresponding members rigidly interconnected by cross members to ensure rigidity of the two linkages whereby jamming of said skip during its ascent and descent is prevented, said linkage members being bellcrank levers interconnected by tubular cross members and connected to said skip by lifting rods.

7. A refuse collecting vehicle comprising a refuse storage body, a loading opening in the rear portion of said refuse storage body, a back-shield pivotally mounted on said refuse storage body, a loading and packing gear supported on said back-shield, said loading and packing gear comprising a trough-shaped refuse-receiving skip provided with a part-cylindrical bottom surface, rollers carried on both sides of said skip for rolling movement along substantially vertical guideways whereby said skip may be raised and lowered on said back-shield, a pair of double-acting lifting rams connected to said skip by a pair of bellcrank lever linkages for raising and lowering said skip, a packing plate arranged above said skip for swinging movement about a substantially horizontal axis so as to close said loading opening in said refuse storage body when said packing plate is in a lowered substantially vertical position, said packing plate being swingable into a raised substantially horizontal position wherein refuse in said skip is precompacted by said packing plate upon movement of said skip into an upper position thereof, a pair of double-acting packing rams connected to said packing plate for swinging said packing plate between said vertical position and said horizontal position, said part-cylindrical bottom surface of said skip having an axis which is substantially coincident with the axis of swing of said packing plate, and said packing plate being swingable by said packing rams from said raised substantially horizontal position to said lowered vertical position whereby precompacted refuse in said skip is forced into said refuse storage body through said loading opening by said packing plate.

No references cited.

HUGO O. SCHULZ, *Primary Examiner.*